Patented Nov. 8, 1927.

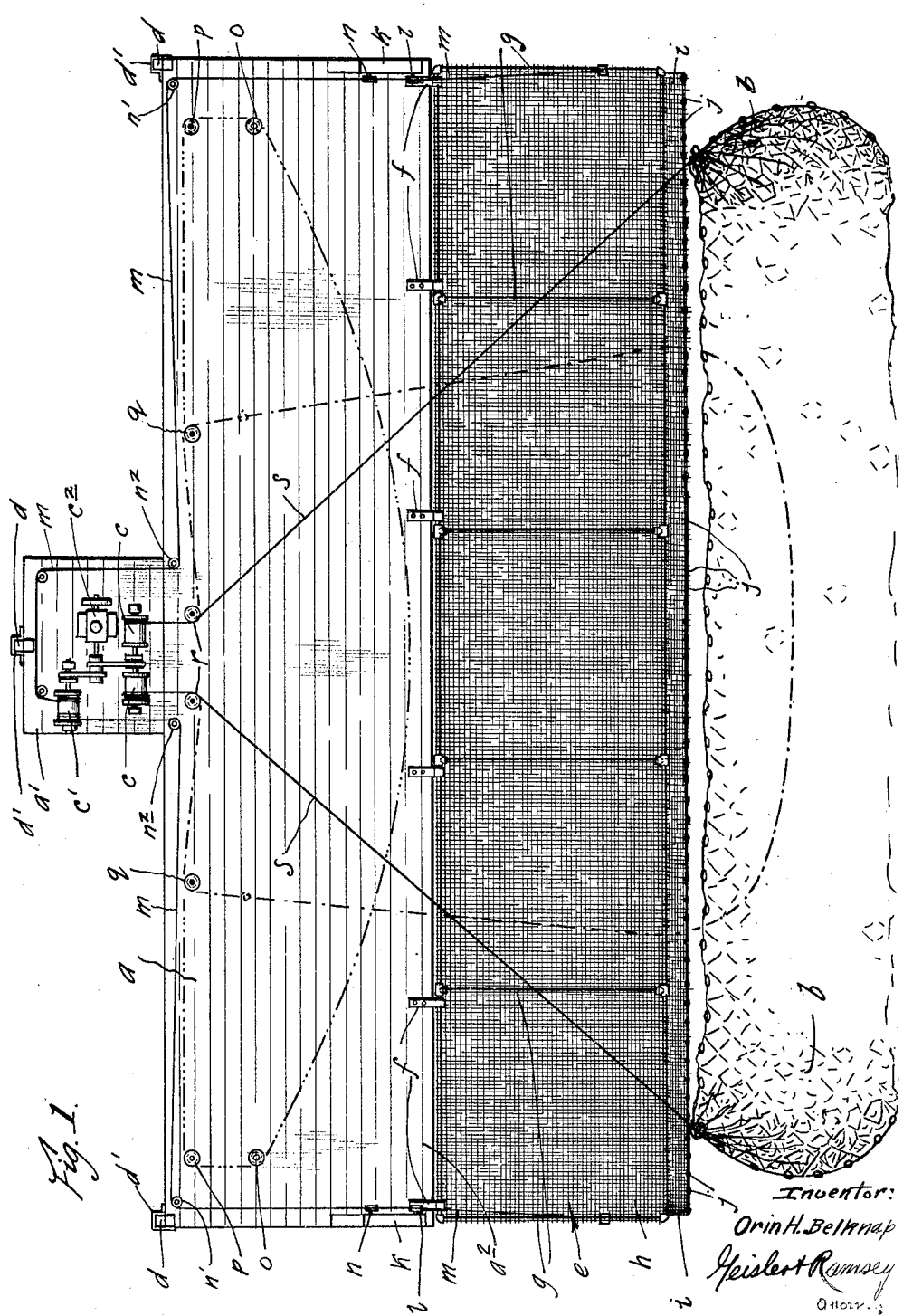

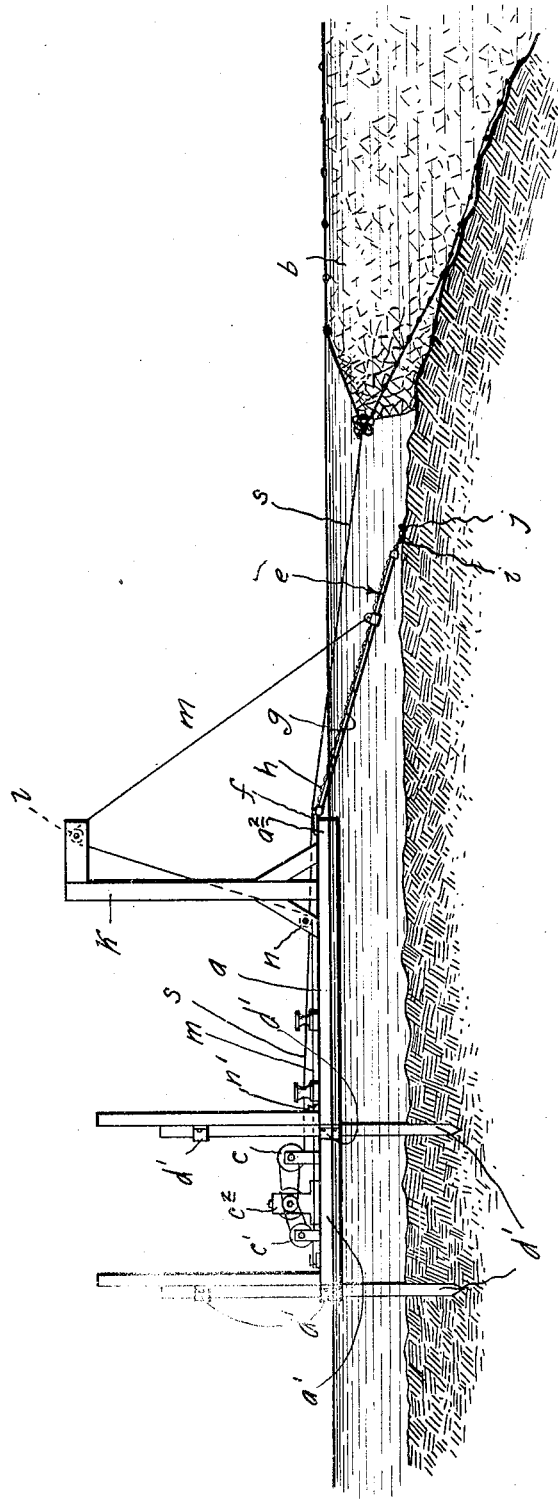

1,648,671

UNITED STATES PATENT OFFICE.

ORIN H. BELKNAP, OF CHINOOK, WASHINGTON.

SEINE LANDING.

Application filed December 28, 1925. Serial No. 77,908.

There are many fish locations that have every desirable feature but a sandy, gently sloping seine landing beach, said desirable fishing locations being encountered especially along the Columbia River. Said locations cannot be used for seining, and thus other modes of fishing must be substituted. Other modes are not as profitable and do not permit operations on such a large scale as the use of seines.

The object of my invention, therefore, is to provide a portable seine landing which may be located adjacent fishing grounds that have no such landing beaches, and which may be anchored firmly in place, and yet is adapted to rise and fall with the tide.

A further object of my invention is to provide a floating landing which is provided with efficient facilities for expeditiously drawing in the seine, opening up the same for the removal of fish therefrom, and for the disposal of the latter after they have been removed.

To attain these objects I provide a relatively large flat topped barge or float provided with "spuds" or post-like anchoring means which are slidably mounted through said barge or float. The deck of the latter constitutes a working platform for drawing in the seine and for removing the fish therefrom. The forward edge of said platform, that is, the edge facing the fishing location, is provided with a hinged non-floating apron. Said apron preferably is made of perforated material, such as netting to permit the water to drain therethrough as well as to present a skeleton-like surface which is relatively unaffected by the forces of waves. Flexible devices are arranged on the lower edge of said apron and are adapted to conform to the irregularities of the river bottom and preferably are made of twine netting having weights along one edge to draw the netting into the depressions in said river bottom.

A derrick or other hoisting means is mounted upon said platform and is adapted to vary the angle which said apron makes with the platform. I preferably provide an engine upon said platform mounted at one side thereof and provide a series of guides about the edges thereof, over which hauling in lines are adapted to be placed so that said engine can draw in the seine and the guides are adapted to open up the seine as it is drawn in so that the fish caught may readily be removed.

The details of construction and mode of operation of my devices are hereinafter described with reference to the accompanying drawings, in which;

Fig. 1 is a plan view of my improved seine landing diagrammatically showing the seine being pursed up and drawn onto said landing; and Fig. 2 is an elevation of seine landing diagrammatically showing the arrangement thereof relative to the body of water and to the seine being drawn in.

My improved landing comprises a float or barge $a$ of relatively large area which serves as a working platform onto which the seine $b$ can be drawn. To one side of the platform $a$ is an offset portion of $a'$ upon which the hoisting winches $c$ and $c'$ can be mounted together with an engine or other hoisting means $c^2$. Holding said landing in position, are a plurality of "spuds" or anchor-like posts $d$ which slidably engage clips $d'$ fastened to said float. This arrangement permits the platform to rise and fall with the tides and yet does not permit the platform to drift down stream or to be pulled out towards the fishing ground when the seine is being drawn towards said landing.

On the forward edge $a^2$ of said platform I mount a hinged apron $e$ which apron is carried by a plurality of hinges $f$ fastened to the platform. Said apron is made of a material heavier than water so as to sink readily. Said apron preferably is made of metal framework, such as pipes $g$, and said framework is covered by perforated material, such as wire netting or slats $h$. Said perforated material thus not only provides a relatively stiff draining surface up which said seine may be drawn but also presents a skeleton-like body which offers little resistance to waves, and the like, and thus is not beaten down by the latter.

On the lower edge of said apron I preferably fasten a flexible section of netting $i$ provided with weights $j$. Said netting is thus permitted to conform to the irregularities of the river bed to prevent any fish, being drawn in by said seine, from slipping under said apron.

I provide derrick arms $k$ on said platform with guide sheaves $l$ mounted therein and lead a hoisting line *m* for the said apron *e* over said guide sheaves. Said line *m* thus is adapted to move said apron about its hinges *j* to vary the angular relationship of the latter. Further guide sheaves *n*, *n'* and *n²* guide said line *m* to the hoisting drum *c'* as shown in Fig. 1.

The lines *m* leading to both sides of apron are wrapped about said drum *c'* in such a manner that the ends will be lifted uniformly. It is to be understood that I do not wish to limit myself to the use of two derrick arms but show two merely as a convenient number. If it should prove that the apron is not stiff enough to be drawn up by lines fastened to the ends only, additional lines and arms might be provided for lifting the middle portions, also.

I provide a number of spools *o*, *p*, *q* and *r* about the rear edge of said platform so that a bight in the seine pulling-in line *s* may be thrown over any of said spools to extend the seine to its desired position. The various arrangements of said line are shown in dotted lines in Fig. 1.

The ends of said seine hauling-in lines *s* are fastened to the drums of the hauling-in winch *c*. When the seine is a good distance away from the landing the lines are arranged as shown in full lines in Fig. 1, that is, inside of the spools *r*. When the seine is brought up approximately to the position shown in Fig. 1, the lines are transferred so as to take a bight around the spools *q* and when the seine is drawn up the line is arranged so as to take a bight around the spools *p* and *o* so as to extend the seine and to permit the fish to be easily removed therefrom.

It is understood that the shape of the float is optional, as is the landing gear, and it is the intention of the patentee to provide rollers and guides over or between which the nets can be drawn, wherever the latter seem useful and desirable.

I claim:

1. A portable landing of the character described, adapted to float on a body of water, said landing comprising a float, a hinged non-floating apron fastened to one edge of said float, a flexible weighted net fastened to the lower edge of the apron, said net being adapted to conform to the irregularities of the bed of the body of water.

2. A portable landing of the character described, adapted to float on a body of water, said landing comprising a float, a hinged apron fastened to one edge of said float, said apron comprising a stiff non-floating frame covered by a relatively flexible net, a flexible weighted net fastened to the lower edge of the frame for said apron, said net being adapted to conform to the irregularities of the bed of the body of water.

3. A portable landing of the character described comprising a float, a hinged non-floating inflexible apron fastened to one edge of said float, the lower edge of said apron being provided with a flexible section adapted to conform with irregularities of the bed of the body of water.

ORIN H. BELKNAP.